Feb. 27, 1968          R. K. TERRILL          3,370,624

SAFETY DEVICE FOR HIGH PRESSURE GAS CONTAINER

Filed Feb. 9, 1966

INVENTOR.
ROY K. TERRILL

BY *Harry A. Herbert Jr.*
*Herbert H. Brown* and
ATTORNEYS

United States Patent Office 3,370,624
Patented Feb. 27, 1968

3,370,624
SAFETY DEVICE FOR HIGH PRESSURE
GAS CONTAINER
Roy K. Terrill, 42604 N. 7th St., Lancaster, Calif. 93534
Filed Feb. 9, 1966, Ser. No. 526,657
1 Claim. (Cl. 141—382)

ABSTRACT OF THE DISCLOSURE

The disclosure pertains to an improved safety strap which can be hitched or unhitched from a collar which is threadably mounted on the neck of a gas tank. The strap is permanently secured at one end, to a hose, which is supplying high pressure gas, or to any other support structure. At the other end, the strap is secured to the collar through an eyelet or similar device. The intermediate portion of the strap is formed of a C-shaped connecting link, having a spring-pressed pivoted latch by which the link can be temporarily disconnected from the eyelet.

---

The invention described herein may be manufactured and used by and for the government for governmental purposes, without the payment to me of any royalties thereon.

The present invention relates to safety devices, more particularly as they pertain to heavy cylindrical containers which carry gas under high pressure. Gases, such as oxygen, acetylene, hydrogen, etc., are used in the industrial field for various purposes, especially as a source of heat in welding. Argon and helium are used mainly in the laboratories for special purposes. The gas pressure runs about 3000 p.s.i. and the gas is transported and dispensed from cast iron cylindrical containers, called "bottles" which carry at the top, a control valve. When in use, a hose is taken from the valve through a coupling to the place of operation and the flow of gas is controlled by a hand wheel on the valve.

It has been found that on occasion when containers are being filled with gas, the supply hose leading to the tank becomes loose at or near the valve connection or coupling and may suddenly give way. The hose would still be connected with the high pressure supply which would cause the freed end of the hose to go through a violent whip action. The free end of the hose would strike out in random directions and it has been known to disable, and even kill personnel, and at least to destroy surrounding equipment. It is therefore necessary to provide some form of restraint on the severe movement of the hose under the conditions noted for the safety of the operator or whomever may, at the moment, be standing near.

One object of the invention is to provide a protective or safety device against the whip action of a suddenly disconnected hose or pipe through which gas under tremendous pressure is being supplied.

Another object is to provide a restraining member on a hose leading from a source of high pressure gas in the event of a break between the hose and the source.

Still another object is to provide an anchor or safety device for a hose connected to a source of fluid at high pressure and which serves to restain the uncontrolled movement of the hose in the event of a break in the line.

Still a further object is to provide a safety hitch between a heavy iron gas bottle and a hose connected to a coupling on the bottle and which tends to break, through wear, at or near the coupling when the bottle is being charged with gas.

Another object is to provide a hitch of the type referred to in which its restraining effect is such as not to introduce any strain on the coupling joints during the normal operation but instantly becomes operable in an emergency.

These objects are attained in brief by providing a multi-unit link including a hook device and an anchor member on the tank, the link being temporarily connected between the gas tank being filled and that portion of the supply line which may be subject to the uncontrollable gyrations, and particularly near the coupling on the tank.

The invention will be better understood when reference is made to the following description and the accompanying drawing, in which.

Figures 1, 2:
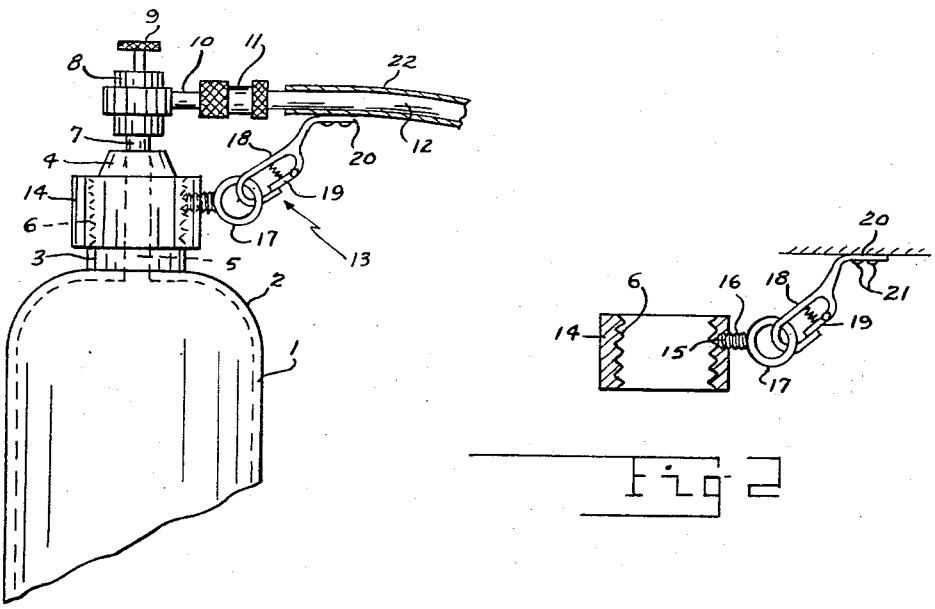
FIG. 1 represents a view partly in section of the combination of a high-pressure gas tank together with its control valve, and to which a supply hose is attached provided with the improved safety device.
FIG. 2 is an enlarged view partly in section of the improved multi-part safety device.

Referring to FIG. 1, reference character 1 designates a heavy cast iron container or bottle having a rounded top section indicated at 2 which terminates in an upright stem 3. The latter has a beveled end 4 and is provided with a center bore or opening 5 which communicates with the interior of the container. The outside periphery of the stem is threaded as at 6. A metal tube 7 is fitted into the opening in the stem and carries at its open end a valve 8 of any suitable and well-known type. The latter is controlled by a hand wheel 9.

From one side of the valve, a piece of tubing 10 is brought out which leads to a coupling 11 of any suitable and well-known type for making a fast connect and disconnect to a supply of high-pressure gas flowing through a hose 12.

It has been found that when connections and disconnections are made often at the coupling to a number of tanks in succession, there is a tendency for the joint or the hose connected to the coupling 11 to become loose and abruptly break. The sudden release of high pressure at the point of the break is sufficient to cause the free end of the hose to move violently in an uncontrolled manner which can produce serious results.

The present invention is directed to an improved device as will prevent this free end of the pipe from producing a whip action under the circumstances stated. The safety device is indicated generally at 13 in FIG. 1 and is shown as a unit in FIG. 2 of the drawings. The device employs a heavy metal collar 14 having a threaded bore which can be received by the threads 6 of the container. It will be understood that the last-mentioned threads are commonly used to anchor the threaded end of a heavy protective cap (not shown) which fits over the valve 8 to protect the latter from damage during transportation of the tank over long distances, perhaps by truck. However, the cap is not fitted on the container until after the filling operation, in order to maintain access to the hand wheel 9 and make proper hose connections. The threads 6 therefore become available for receiving the collar portion of the safety device.

The collar has a tapped hole 15 at the side, about one-half way down to receive a threaded stud 16 which carries a metal eyelet 17. The stud may be additionally welded in position, if desired. As shown in FIG. 2, the remaining part of the safety device is formed of a C-shaped hook member 18 having a spring pressed pivoted latch 19. The hook with its latching member is integrally joined to a bar extension 20 provided with a pair of holes (not shown) for receiving screws indicated at 21. In case the hose is made of rubber, the screws may be fastened to a metal braid lining 22 which may be of short length to serve as a clamp near the coupling 11 or for a longer distance, depending on the most likely position of a break in the hose line. In order to obtain a secure joint at the hose, the bar member 20 may be provided with a concave surface to fit against the rounded surface of the clamp.

It is apparent that due to the looseness of attachment between the hitching hook 18 and the eyelet, there can be no physical strain imposed on any of the tubing 10 or hose 12, and yet, the hitch or safety link member will prevent any undue movement of these elements with respect to the tank in the event a breakage occurs which might otherwise cause the free end of the hose to whip violently when suddenly disconnected from the valve 8 or the coupling 11. It is also evident that the safety device can be readily unhooked from the tank 1 to allow a second tank to be filled with gas and the same collar 14 can be applied to the second tank which already will not have received its protective cap.

While I have shown and described the improved safety device when used in connection with a tank which is being charged with high pressure gas, it will be understood that the same device can be used with tanks, already filled, and which serve as a source of gas for welding and other industrial purposes. The hose 12 then becomes a dispensing hose. The normal protective cap (not shown) will have become removed to permit access to the control valve so that the threaded sleeve 14 can be applied. The link member could then be connected or extended to a metal hand grip (not shown) in any suitable manner which surrounds the dispensing hose or to any other position on the hose where there is the slightest possibility of a break.

Figure 3:
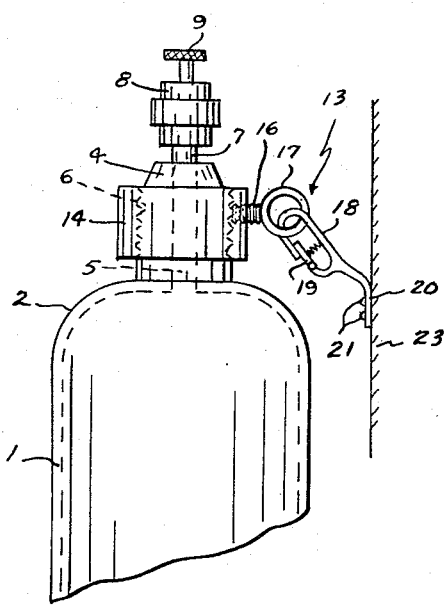
FIG. 3 depicts an elevational view but partly in section showing another typical use for the improved safety link or apparatus.

In FIG. 3, there is shown the manner in which the improved safety device can be used as a hitch or support. It is sometimes desirable temporarily to set an empty tank near a wall, indicated at 23, to await its turn to be filled. The bar extension 20 can be secured to the wall at the proper height and the opposite end of the safety device can be hooked to the eyelet which is fastened to the collar 14. Thus the tank is prevented from being knocked over from any cause and the hitch can be readily removed by opening the hook portion in order to move the tank to another position.

The wall 23 may also constitute the side of a truck in which the tanks without their protective caps are being hauled short distances from one location of use to another. The safety device has therefore many uses in connection with operation of tanks containing a gas under high pressure, and in which no undue strains are imparted to the various supply and service hoses through which gas is flowing under controlled conditions.

While I have shown and described the device as employing a collar which is threaded to the threads that are normally provided at the top end of a gas container of the type mentioned, it will be understood that this collar need not contain threads but can be clamped in any suitable manner to the stem of the gas container. However, it has been found that the use of the threads already provided on the gas container lend themselves to extreme safety at the point where the collar is attached to the stem.

While certain specific embodiments have been described, it is obvious that numerous changes may be made without departing from the general principle and scope of the invention.

I claim:

1. In combination, a container, a supply hose connected thereto for dispensing gas under high pressure into the container, said container being provided with a necked-down portion having screw threads and a control valve, a safety device comprising a collar having internal threads which are engaged by the threads of said container, attaching means on said collar, a member terminating in a hook at one end and secured at said end to said attaching means, the other end of said member terminating in a solid portion affixed to the hose whereby the device, as a whole, prevents whipping effect in the event of a breakage of the hose in the region of the connection to the container.

References Cited

UNITED STATES PATENTS

| | | | |
|---|---|---|---|
| 1,189,970 | 7/1916 | Kline | 248—79 |
| 1,209,184 | 12/1916 | Markwell | 248—217 |
| 1,566,597 | 12/1925 | Harman | 141—382 |
| 1,910,070 | 5/1933 | Spaeth | 141—382 |
| 2,146,948 | 2/1939 | Feykert et al. | 141—382 |
| 2,884,151 | 4/1959 | Biederman | 220—38.5 |

ROY D. FRAZIER, *Primary Examiner.*

ROBERT P. SEITTER, *Assistant Examiner.*